(12) United States Patent
Jones, Jr. et al.

(10) Patent No.: US 11,827,142 B1
(45) Date of Patent: Nov. 28, 2023

(54) ADJUSTABLE LIGHTING MOUNTING RING FOR VEHICLE WHEELS

(71) Applicants: William H. Jones, Jr., Holly Hill, FL (US); Jon Osborne, Holly Hill, FL (US)

(72) Inventors: William H. Jones, Jr., Holly Hill, FL (US); Jon Osborne, Holly Hill, FL (US)

( * ) Notice: Subject to any disclaimer, the term of this patent is extended or adjusted under 35 U.S.C. 154(b) by 0 days.

(21) Appl. No.: 17/833,068

(22) Filed: Jun. 6, 2022

(51) Int. Cl.
*B60Q 1/32* (2006.01)
*B60B 7/00* (2006.01)

(52) U.S. Cl.
CPC .............. *B60Q 1/326* (2013.01); *B60B 7/006* (2013.01)

(58) Field of Classification Search
CPC .......... B60Q 1/326; B60Q 7/006; B60Q 7/01; B60B 7/04; B60B 7/006; F21W 2107/10; F21V 21/14; F21V 21/22
See application file for complete search history.

(56) References Cited

U.S. PATENT DOCUMENTS

| 6,322,237 | B1 * | 11/2001 | Lee | B60Q 1/326 362/500 |
|---|---|---|---|---|
| 10,596,849 | B2 * | 3/2020 | Boucher | B60B 7/04 |
| 2012/0223571 | A1 * | 9/2012 | Clark, II | B60B 7/006 301/37.25 |

* cited by examiner

*Primary Examiner* — Peggy A Neils
*Assistant Examiner* — James M Endo
(74) *Attorney, Agent, or Firm* — J. Wiley Horton

(57) ABSTRACT

A decorative lighting system for a vehicle wheel incorporating a mounting ring with an adjustable diameter. The adjustable mounting ring is made as two separate segments. The two segments include cooperative overlapping extensions that allow them to be linked together into a circle having a desired diameter.

16 Claims, 11 Drawing Sheets

ADJUSTABLE LIGHTING MOUNTING RING FOR VEHICLE WHEELS

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of vehicle lighting. More specifically, the invention comprises an adjustable mounting ring system for wheel lighting.

2. Description of the Related Art

The present invention is a significant improvement to an existing system for mounting decorative lighting within a vehicle wheel. This disclosure begins by describing exemplary prior art systems. This background information will benefit the reader in understanding the advantages created by the present invention. However, the reader should bear in mind that the invention is by no means limited to the examples provided. Many other embodiments will occur to those knowledgeable in the field of vehicle lighting.

Decorative vehicle lighting has become quite popular in recent years. Inexpensive LEDs and LED controllers have facilitated its expansion. Creative designers often seek new areas to illuminate. One such area is the volume within a vehicle's wheels—which is customarily occupied by brake hardware. FIG. 1 shows an exemplary prior art vehicle 10. Wheel 14—along with its attached tire 12—is mounted to a rotating hub assembly by multiple lug nuts 16. Vehicle lighting designers seek to illuminate the area inside the wheel's rim. The spokes of the wheel become a blur as the wheel rotates—leaving a continuous illumination effect as the vehicle moves along.

It is challenging to mount decorative lighting in this area. FIGS. 1-4 depict one suitable mounting approach. The hub assemblies of vehicle 10 are supported so that wheels 14 can be removed. This support is often provided by placing the entire vehicle on a lift, but other approaches may be used as well.

FIG. 2 shows the left front hub area after the wheel and tire have been removed. For this particular type of vehicle, the rotating hub assembly is mounted on a steering knuckle (which pivots but does not rotate with the wheel). The steering knuckle is attached to upper control arm 26 and lower control arm 28—usually by flexible bushings. The braking components comprise rotor 18 and its associated caliper assembly 24. Rotor 18 mounts over the hub assembly. In this example six lug studs 20 extend laterally outward from the hub assembly—through six corresponding passages 22 through rotor 18.

In order to affix the lighting mounting hardware, it is generally necessary to remove caliper assembly 24 and rotor 18. The caliper assembly in this example is bolted to the steering knuckle.

These bolts are removed and the caliper assembly is moved away from the rotor and separately supported (in order to avoid placing undue strain on the flexible brake lines attached to the caliper assembly). Rotor 18 is then translated so that passages 22 slide over lug studs 20.

FIG. 3 shows the assembly after the rotor has been removed. Hub assembly 32 is configured to freely rotate. Dust shield 30 does not rotate. It is typically attached to the steering knuckle (The steering knuckle lies entirely behind the dust shield from the vantage point of FIG. 3). The dust shield in this example is a metal stamping that is fairly stiff. It typically serves the purposes of (1) slowing the transfer of heat from the braking system to the suspension system and other components, and (2) protecting the brake system from water and debris contamination (For this latter reason the dust shield is sometimes called a "splash shield").

The objective of the prior art—and for the present invention—is to install decorative lighting in the area shown in FIG. 3. It is impractical to attach the lighting to hub assembly 32, since it rotates at high speed. While it is theoretically possible to attach the lighting to the caliper assembly or the steering knuckle itself, this is often impractical. The caliper assembly and the steering knuckle are typically thick steel castings or forgings. It is quite difficult to drill holes or add other attachment features to such components. On the other hand, dust shield 30 is flat and—in most cases—includes large planar surfaces. The dust shield is often made of mild steel and it is easy to drill mounting holes through this material. For these reasons, the dust shield is the typical mounting point for decorative lighting.

FIG. 4 shows a prior art decorative lighting assembly mounted using dust shield 30. The over-arching concept is to position mounting ring 50 so that it lies inside the rim of wheel 14 and does not interfere with any fixed or rotating equipment in close proximity. The rotating equipment is the rotor, wheel rim, and wheel spokes. The fixed equipment is generally the brake caliper assembly. Multiple LEDs 52 are affixed to mounting ring 50—typically in an orientation so that they shine outward. The light they produce is reflected by the inward facing surfaces of the wheel rim—creating a pleasing visual effect. Some of the light may also be projected outward laterally from the wheel or in other desired directions. The LEDs in this example are electrically connected to a remotely located controller.

Mounting brackets 34, 36, 38, 40 are used to connect mounting ring 50 to dust shield 30. In this case the mounting ring and brackets are made of aluminum, so it is easy to attach them using threaded fasteners. A portion of each mounting bracket passes inward of the dust shield (inward meaning toward the centerline of the vehicle). Holes are drilled through the dust shield and fasteners 42, 44, 46, 48 are passed through these holes and through corresponding holes in the mounting brackets. The fasteners are tightened in order to firmly attach the mounting brackets to the dust shield.

The outer portions of the mounting brackets are likewise attached to mounting ring 50. Slots or other adjusting features are preferably used for the attachments so that the installer can adjust the position of mounting ring 50 relative to hub assembly 32. The installer generally wants the mounting ring to be concentric with the hub assembly. Some adjustments need to be made in order to ensure that the mounting ring does not interfere with the rotor, the wheel, the caliper assembly, the flexible brake line, or some other object. Screws or clamps are typically employed to connect the mounting ring to the mounting brackets.

The same general process is used to add decorative lighting to all four wheels of a vehicle. The rear wheels will generally have a different configuration. As an example, a fixed "suspension knuckle" will support the hub assembly rather than a pivoting steering knuckle. The brake caliper configuration and dust shield configuration will also often be different. The mounting points will be varied by the installer to accommodate these differences.

The mounting ring shown in the example of FIG. 4 must be a particular diameter in order to fit into the available annular space between the outer perimeter of the dust shield and the inward facing surface of the wheel rim. Of course, there are many different vehicle wheel sizes and dust shield sizes. The prior art solution to accommodating this variety has been the provision of many different sizes of mounting rings. Even with the various available sizes, some vehicle wheel/hub combinations cannot be accommodated. A better solution would be the provision of a mounting wheel having an adjustable diameter. The present invention provides such a solution.

BRIEF SUMMARY OF THE PRESENT INVENTION

The present invention comprises a decorative lighting system for a vehicle wheel incorporating a mounting ring with an adjustable diameter. The adjustable mounting ring is made as two separate segments. The two segments include cooperative overlapping extensions that allow them to be linked together into a circle having a desired diameter.

REFERENCE NUMERALS IN THE DRAWINGS

Figure 1:
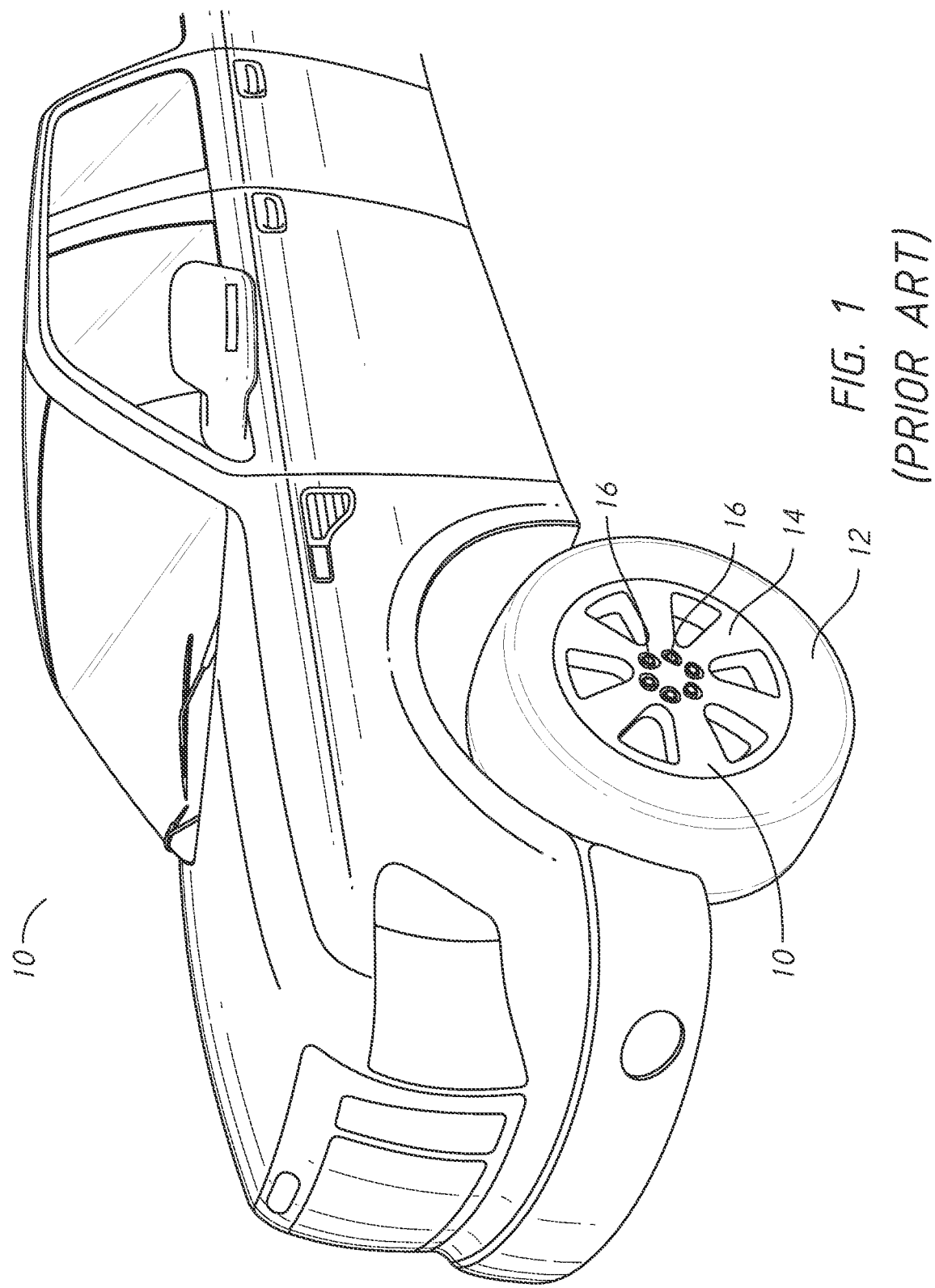
FIG. 1 is a perspective view, showing a prior art vehicle.
Figure 2:
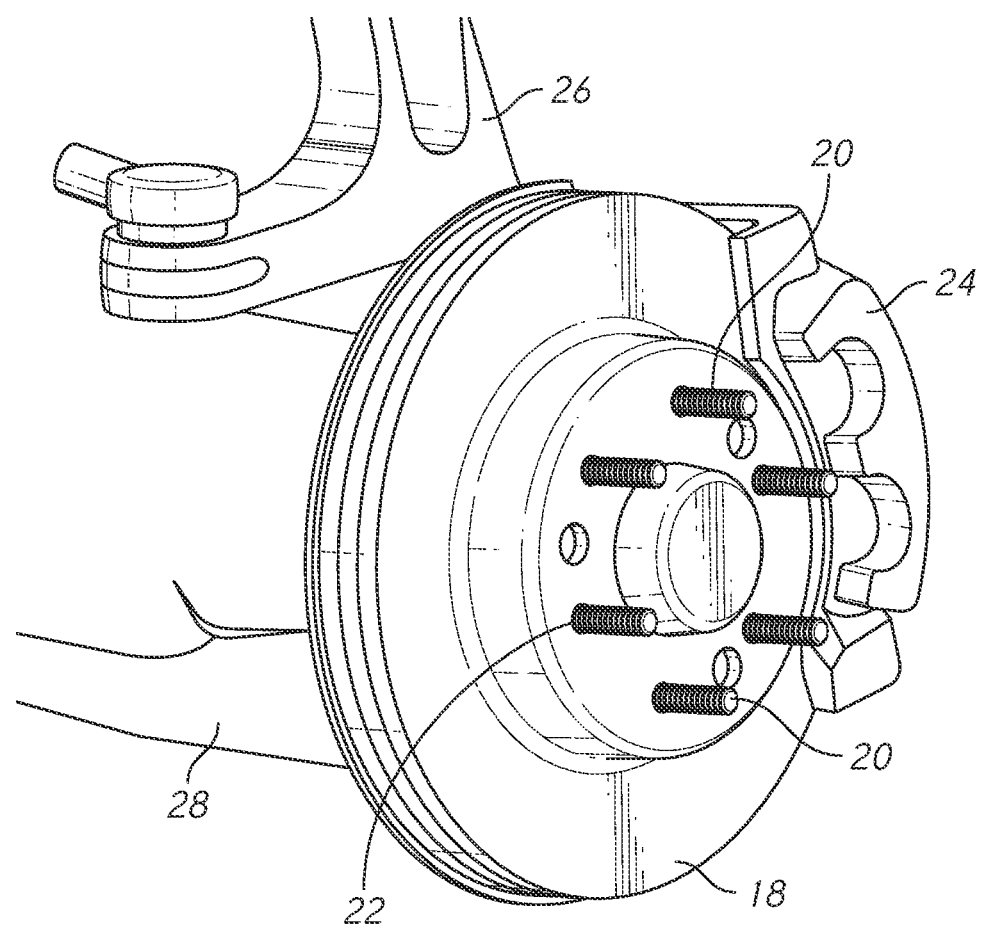
FIG. 2 is a perspective view, showing a prior art vehicle with the wheel and tire removed.
Figure 3:
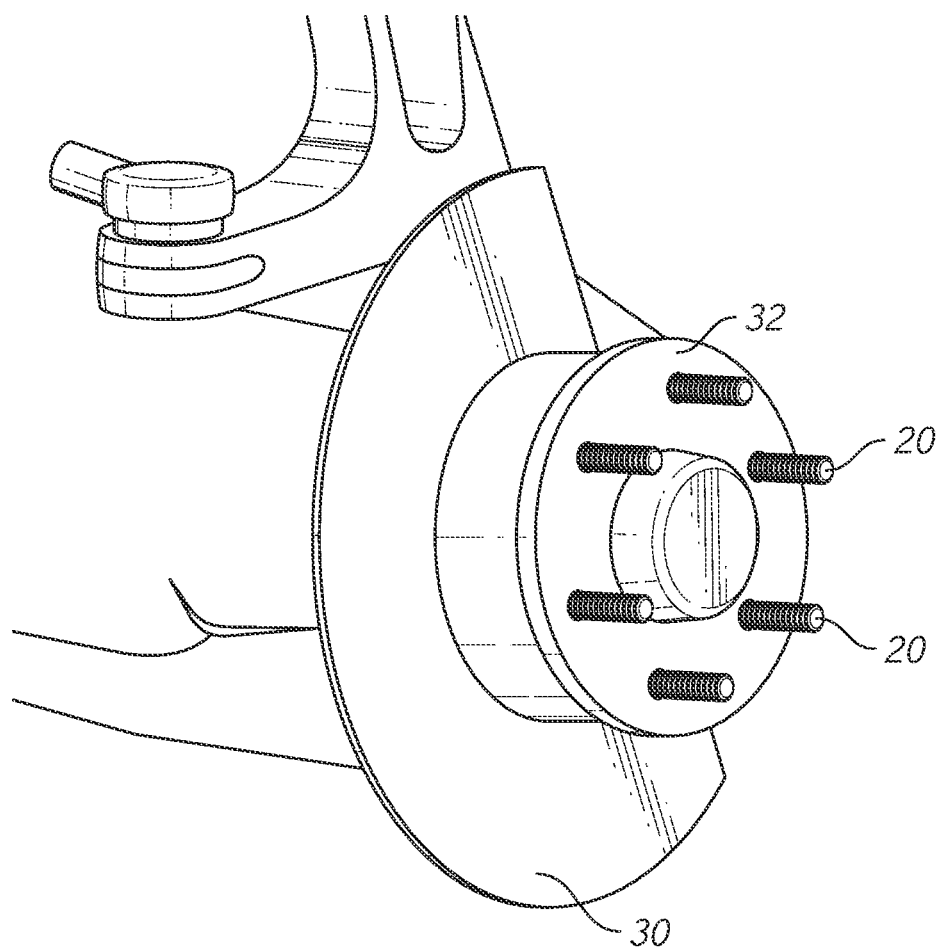
FIG. 3 is a perspective view, showing the configuration of FIG. 2 with the caliper assembly and rotor removed.

10 vehicle
12 tire
14 wheel
16 lug nut
18 rotor
20 lug stud
22 passage
24 caliper assembly
26 upper control arm
28 lower control arm
30 dust shield
32 hub assembly
34 mounting bracket
36 mounting bracket
38 mounting bracket
40 mounting bracket
42 fastener
44 fastener
46 fastener
48 fastener
50 mounting ring
52 LED
54 adjustable mounting ring
56 adjustable ring segment
58 adjustable ring segment
60 overlap
62 overlap
64 first full section segment
66 first partial section extension
68 second partial section extension
70 second full section segment
72 third partial section extension
74 fourth partial section extension
76 first gap
78 second gap
80 gap
82 fastener
83 inward facing surface
84 outward facing surface
86 first perpendicular surface
88 second perpendicular surface
90 countersunk hole
92 threaded receiver
94 first overlap
96 second overlap

DETAILED DESCRIPTION OF THE INVENTION

Figure 4:
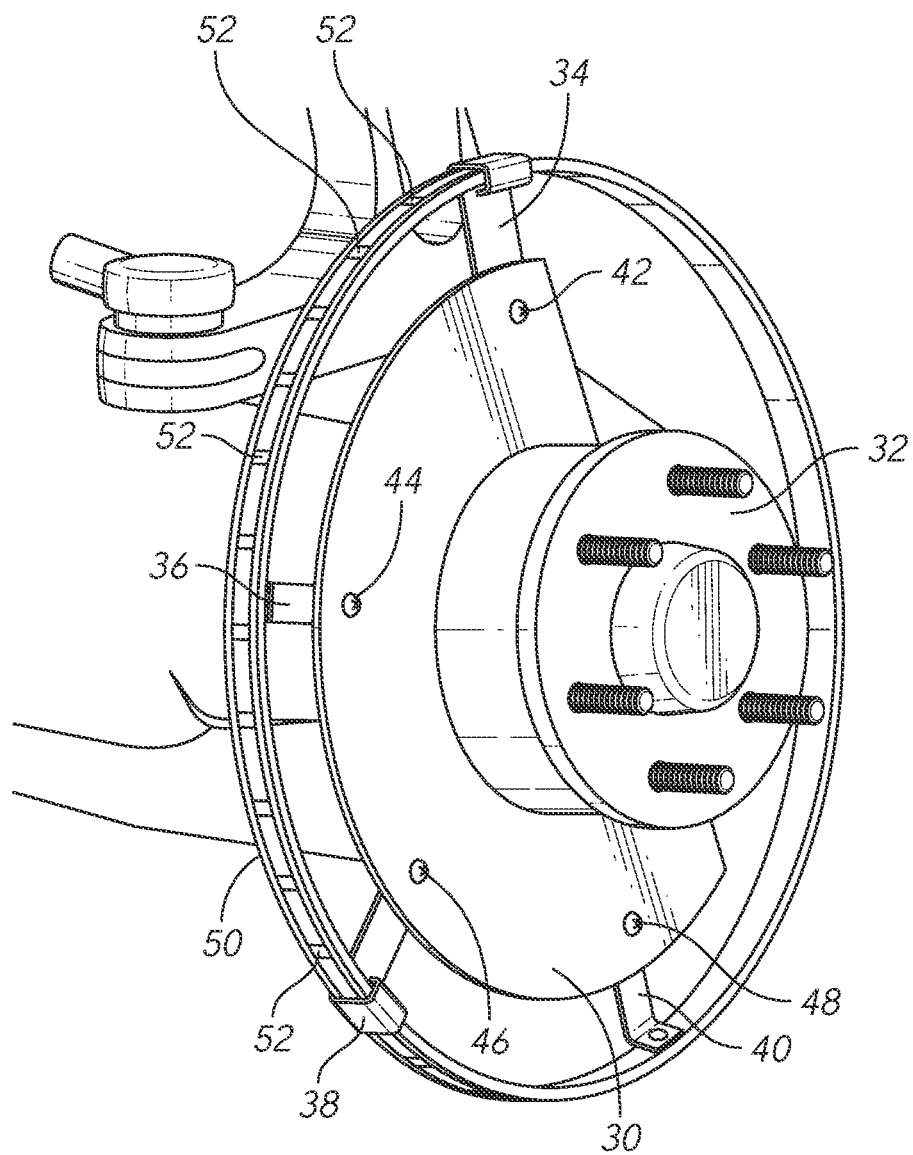
FIG. 4 is a perspective view, showing the configuration of FIG. 3 with the addition of a decorative lighting system.

The lighting system of the present invention is able to use many of the prior art components depicted in the example of FIG. 4. The inventive system can still use the mounting brackets 34-40 attached to dust shield 30. The inventive system can still use the light sources—such as multiple LEDs 52. However, rather than requiring the selection of a suitably sized mounting ring from a stock of various mounting rings, the present invention uses a single type of mounting ring having an adjustable diameter. The inventive adjustable mounting ring can be substituted for the fixed mounting ring 50 shown in FIG. 4.

Figure 5:
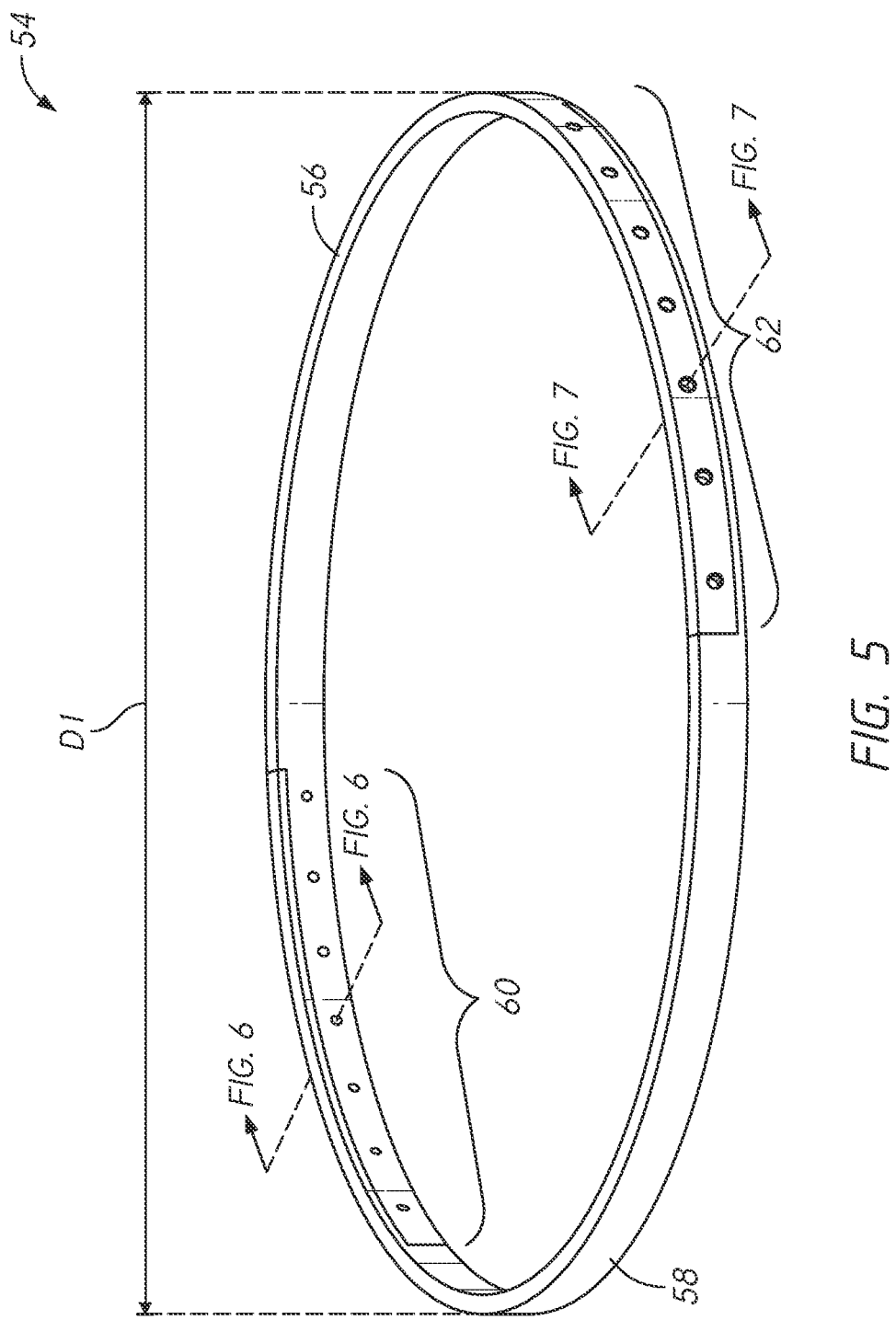
FIG. 5 is a perspective view, showing the adjustable mounting ring of the present invention.

FIG. 5 shows adjustable mounting ring 54. The adjustable mounting ring is created using two adjustable ring segments that are linked together. Adjustable ring segment 58 is overlapped with—and connected to—adjustable ring segment 56. In the configuration shown in FIG. 5, overlaps 60 and 62 are maximized. This results in the minimum overall diameter D1 for the adjustable mounting ring.

Figures 6, 7:
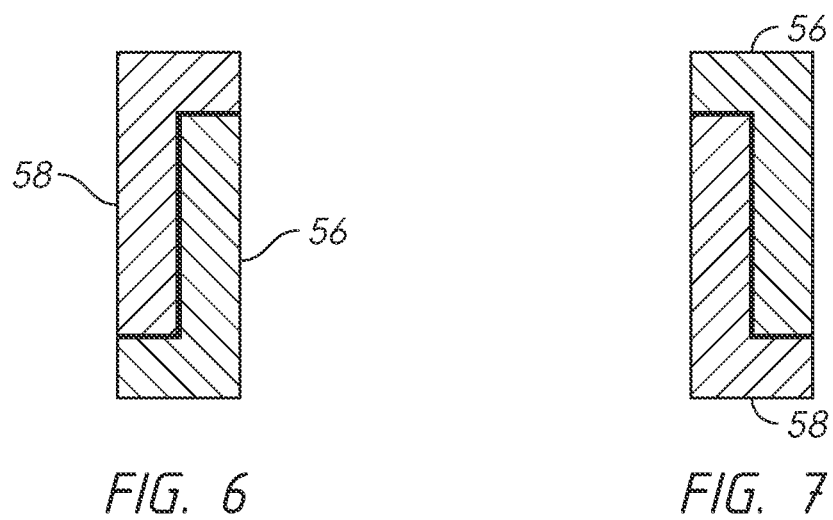
FIG. 6 is a sectional view through the adjustable mounting ring.
FIG. 7 is a sectional view through the adjustable mounting ring.

The reader will note in FIG. 5 the locations of section view "callouts" for FIGS. 6 and 7. FIG. 6 provides a sectional elevation view through the adjustable mounting rings 56, 58 in the region of overlap 60. In the embodiment shown each adjustable mounting ring has an L-shaped cross section in the region of overlap. FIG. 7 provides a sectional elevation view in the region of overlap 62. L-shaped cross sections are again present, though the orientation is reversed.

Figure 8:
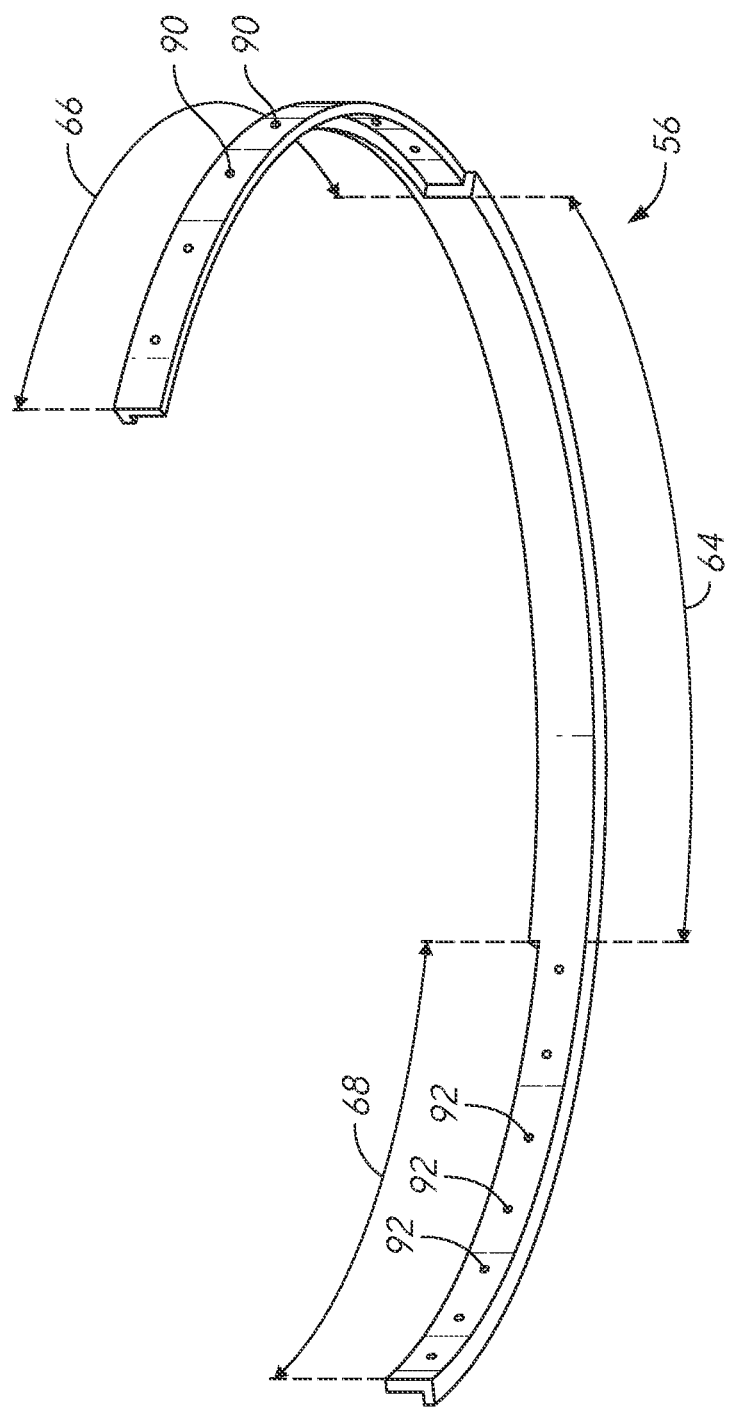
FIG. 8 is a perspective view, through a first segment of the adjustable mounting ring.
Figure 9:
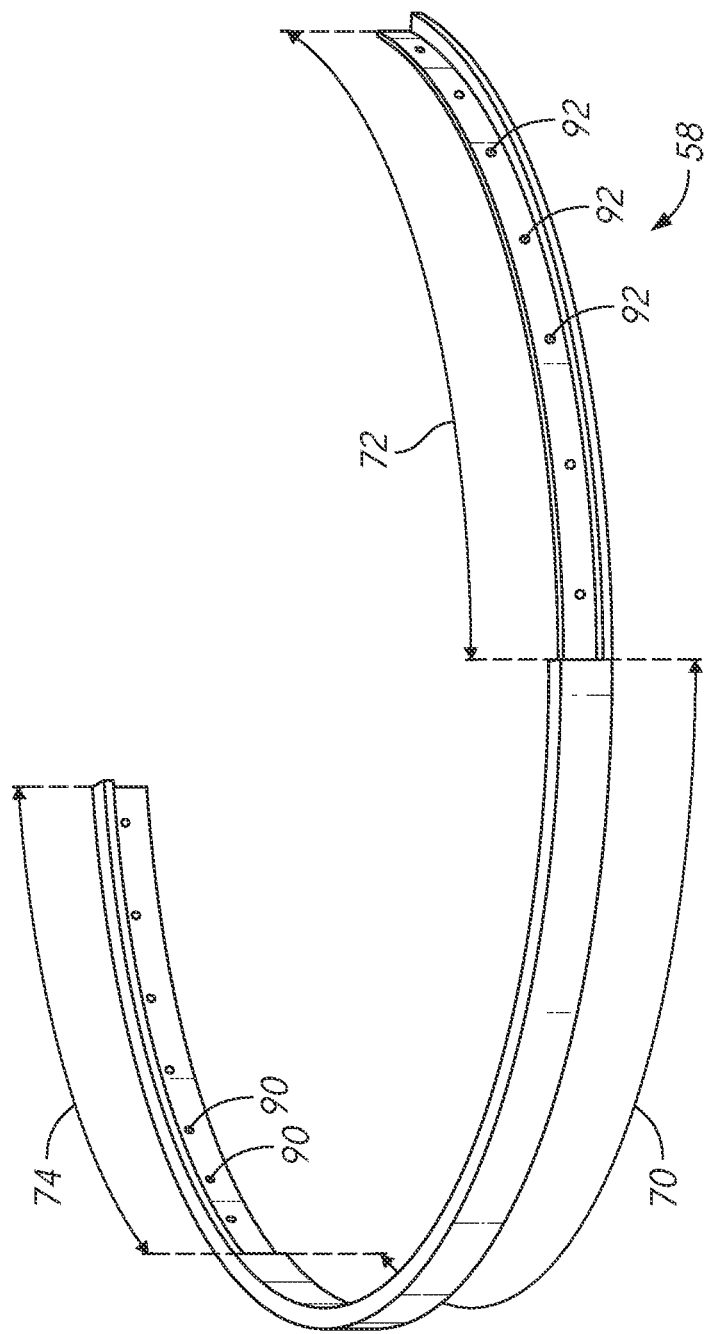
FIG. 9 is a perspective view, through a second segment of the adjustable mounting ring.

FIGS. 8 and 9 provide perspective views to aid the reader's understanding of the structure of the two adjustable ring segments. FIG. 8 shows a view of adjustable ring segment 56 by itself. The adjustable ring segment is provided in the curved shape shown. It includes three distinct sections. First full section segment 64 is in the middle. First partial section extension 66 extends from a first end of first full section segment 64. The reader will note that the cross section of partial section extension 66 is only part of the cross section in the full section segment 64 (an L-shaped part of a rectangular full section). Second partial section segment 68 extends from a second end of first full section segment 64.

Adjustable ring segment 56 also includes features allowing it to be connected to adjustable ring segment 58. In this example, threaded receivers 92 are provided on second partial section extension 68 and countersunk holes 90 are provided on first partial section extension 66.

FIG. 9 depicts adjustable ring segment 58 by itself. Second full section segment 70 lies in the middle. Third partial section extension 72 extends from a first end of second full section segment 70. Fourth partial section extension 74 extends from a second end of second full section segment 70. The partial section extensions are again L-shaped. Countersunk holes 90 are provided in fourth partial section extension 74 and threaded receivers 92 are provided in third partial section extension 72.

Figure 10:
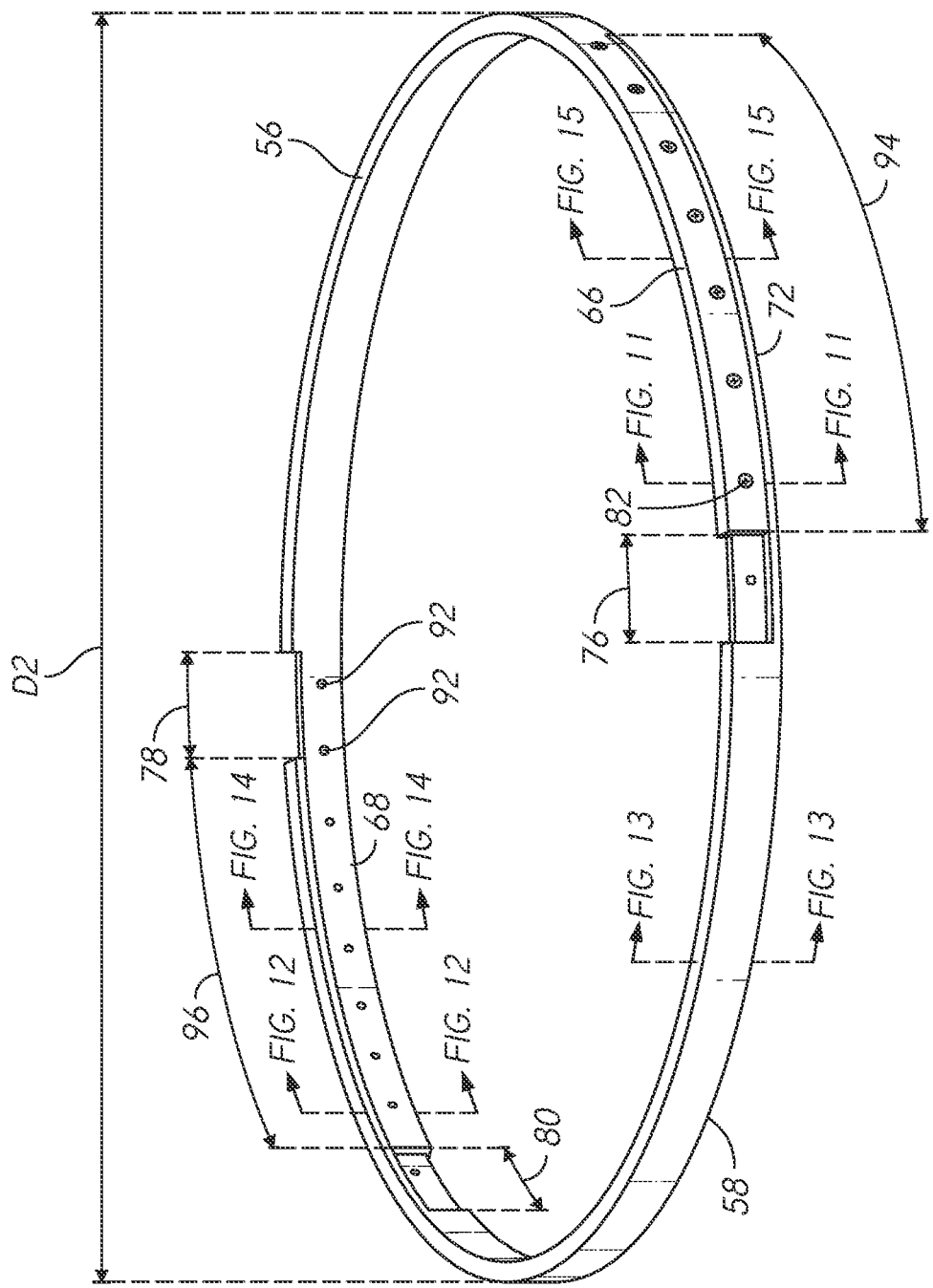
FIG. 10 is a perspective view, showing the first and second segments assembled in a first configuration.

In studying FIGS. 8 and 9 the reader will note that the partial section extensions are designed to overlap and interlock. FIG. 10 shows the two adjustable ring segments 56, 58 engaged together. In this view, the reader will perceive how the partial section extensions overlap and interlock. First partial section extension 66 lies over third partial section extension 72—creating first overlap 94. Likewise, fourth partial section extension 74 lies over second partial section extension 68—creating second overlap 96.

The amount of overlap is adjustable. The countersunk holes 92 and threaded receivers 92 are provided in equally spaced arrays so that multiple holes and receivers will align as the amount of overlap is varied. In the example of FIG. 10, the overlaps are adjusted so that first gap 76 and second gap 78 are equal (In other configurations the gaps need not be equal). This produces an overall diameter D2 that is greater than the overall diameter D1 shown in FIG. 5. Fasteners 82 are passed through the countersunk holes in partial section extension 66 and into the threaded receivers in third partial section extension 72. Likewise, additional fasteners are passed through the countersunk holes in fourth partial section extension 74 and into the threaded receivers in second partial section segment 68.

Figure 11:
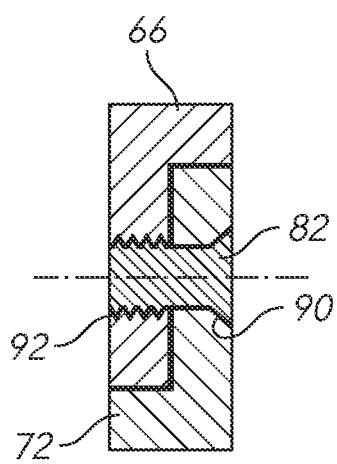
FIG. 11 is a sectional view through the adjustable mounting ring.

The reader will also note "callouts" in FIG. 10 for the positions of sectional elevation views shown in FIGS. 11-15. FIG. 11 shows a section taken through the position of the first fastener 82 in first overlap 94. FIG. 11 shows how fastener 82 passes through countersunk hole 90 in first partial section extension 66 and threads into threaded receiver 92 in third partial section extension 72. When this fastener is tightened, first partial extension section 66 is clamped against third partial section extension 72. Returning briefly to FIG. 11, the reader will note that it is preferable to use multiple fasteners 82 passed through all the holes and threaded receivers available.

Figure 12:
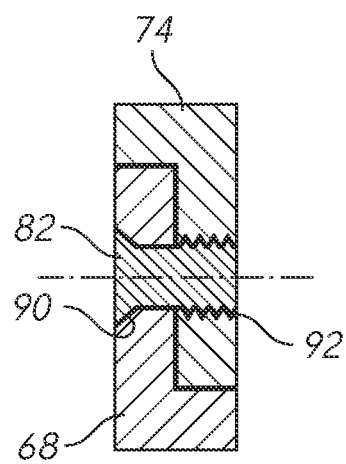
FIG. 12 is a sectional view through the adjustable mounting ring.

FIG. 12 is also taken through the position of a fastener—in this case a fastener used to clamp fourth partial section extension 74 against second partial section extension 68. Numerous fasteners are also preferably used to clamp these two portions together.

Figure 13:
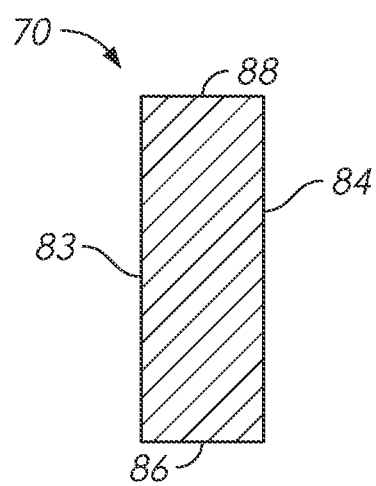
FIG. 13 is a sectional view through the adjustable mounting ring.
Figure 14:
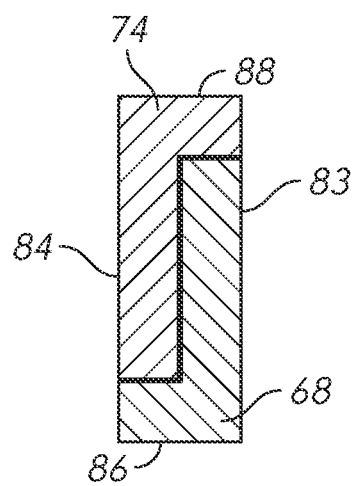
FIG. 14 is a sectional view through the adjustable mounting ring.
Figure 15:
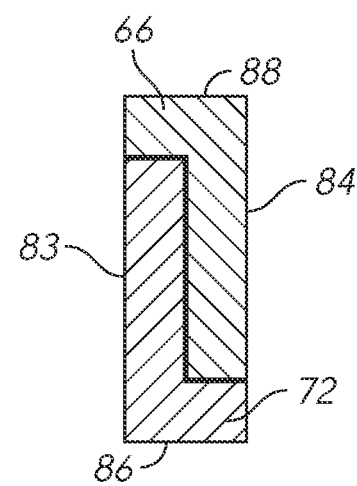
FIG. 15 is a sectional view through the adjustable mounting ring.

FIGS. 13-15 serve to illustrate generally what is meant by a "full section segment" and a "partial section segment." FIG. 13 depicts a sectional elevation view taken through second full section segment 70 of adjustable ring segment 58. The full section segment has inward facing surface 83 (facing in toward the center of the circle), outward facing surface 84, first perpendicular surface 86, and second perpendicular surface 88. In the example shown, the full section is a rectangle.

FIG. 14 depicts a sectional elevation view taken through second overlap 96 (see FIG. 10). The reader will note how the two L-shaped partial extension sections 68, 74 nest and overlap so that they—in combination—occupy the same area as the full section segment. The reader will also note the presence of inward facing surface 83, outward facing surface 84, first perpendicular surface 86, and second perpendicular surface 88.

FIG. 15 depicts a sectional elevation view taken through first overlap 94. Again, the reader will note how the two partial extension sections 66, 72 nest and overlap to occupy the same area as the full section segment. The same surfaces 83, 84, 86, 88 are also present.

The invention is not limited to L-shaped partial extension sections. Many other shapes could satisfy the objectives of overlapping and nesting in order to create stability. Returning to FIG. 10, the reader will recall that the two gaps 76, 78 are equal in the configuration shown. The two segments 56, 58 can be connected without the two gaps being equal. In fact, the presence of an unequal gap represents an intermediate adjustment step for the overall diameter of the assembly. In the example shown, seven fasteners are used to connect each overlap. If the gaps 76, 78 are widened, then fewer fasteners will be able to connect the overlap. In some positions, six fasteners, five fasteners, or even fewer can be used.

It is preferable to make the two adjustable ring segments 56, 58 from a resilient material for which the curvature can be readily varied without causing plastic deformation. Aluminum is a good material for this purpose. Fiber reinforced composites can also be used.

Many decorative lighting system installations are made by trial and error. Returning to FIG. 4, the installer can assemble the adjustable mounting ring and place it in the position shown for mounting ring 50. The installer can manually increase or decrease the ring diameter—by adjusting the overlaps—until a good fit is seen. The installer then marks the position of the two ring segments relative to each other. The installer then installs fasteners to lock the adjustable mounting ring in the desired configuration.

LEDs or other illumination sources can then be added to the adjustable mounting ring as for the prior art—using adhesives, screws, tie clamps, etc. The balance of the installation process is the same as for the prior art.

Many other variations are possible for the invention, including:

1. Attaching the mounting brackets to a fixed object other than the dust shield. As long as they are secured to the vehicle proximate the hub assembly, the inventive adjustable mounting ring will function.
2. The lighting source need not be LEDs. LEDs merely represent the most common illumination source at the present time.
3. The partial section extensions can utilize U-shaped cross sections rather than L-shaped cross sections.
4. The fasteners can be clamps rather than screws.
5. The mounting bracket or brackets can assume any desired form.
6. Some or all of the holes 90 may be made as elongated slots to allow for additional fine adjustment of the overall diameter of the assembly.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

The invention claimed is:
1. A decorative lighting system for a vehicle, comprising:
   (a) a hub assembly;
   (b) a dust shield proximate said hub assembly;
   (c) a plurality of mounting brackets connected to said dust shield;
   (d) an adjustable mounting ring connected to said plurality of mounting brackets, said adjustable mounting ring including a first adjustable ring segment and a second adjustable ring segment secured to said first adjustable ring segment;
   (e) said first and second adjustable ring segments being made of resilient material so that a curvature of each of said first and second adjustable ring segments can be altered without causing plastic deformation;
   (f) said first adjustable ring segment including,
      (i) a first full section segment,
      (ii) a first partial section extension extending from said first full section segment,
      (iii) a second partial section extension extending from said first full section segment;
   (g) said second adjustable ring segment including,
      (i) a second full section segment,
      (ii) a third partial section extension extending from said second full section segment, said third partial section extension overlapping said first partial section extension to create a first overlap, with said third partial section extension and said first partial section extension combining in said first overlap to create a full section,
      (iii) a fourth partial section extension extending from said second full section segment, said fourth partial section overlapping said second partial section extension to create a second overlap, with said fourth partial section extension and said second partial section extension combining in said second overlap to create a full section;
   (h) said third partial section extension being connected to said first partial section extension;
   (i) said fourth partial section extension being connected to said second partial section extension;
   (j) wherein said first and second overlaps are variable in order to vary a diameter of said adjustable mounting ring;
   (k) a plurality of fasteners locking said first and second overlaps together, thereby fixing said diameter of said adjustable mounting ring; and
   (l) a plurality of lights mounted on said adjustable mounting ring.

2. The decorative lighting system as recited in claim 1, wherein:
   (a) said first partial section extension, said second partial section extension, said third partial section extension, and said fourth partial section extension have an L-shaped cross section;
   (b) said L-shaped cross section of said third partial section extension is rotated 180 degrees from said L-shaped cross section of said first partial section extension; and
   (c) said L-shaped cross section of said fourth partial section extension is rotated 180 degrees from said L-shaped cross section of said second partial section extension.

3. The decorative lighting system as recited in claim 1, wherein said fasteners used to connect said third partial section extension to said first partial section extension and said fourth partial section extension to said second partial section extension are each aligned with an axis pointed inward toward a center of said adjustable mounting ring.

4. The decorative lighting system as recited in claim 3, wherein each of said partial section extensions includes a plurality of transverse holes configured to receive said fasteners.

5. The decorative lighting system as recited in claim 1, wherein each of said partial section extensions includes a plurality of transverse holes configured to receive said fasteners.

6. The decorative lighting system as recited in claim 1, wherein said full section includes an inward facing surface and an outward facing surface.

7. A decorative lighting system for a vehicle having a hub assembly and a dust shield proximate said hub assembly, comprising:
   (a) a mounting bracket connected to said dust shield;
   (b) an adjustable mounting ring connected to said mounting bracket, said adjustable mounting ring including a first adjustable ring segment and a second adjustable ring segment secured to said first adjustable ring segment, said first and second adjustable ring segments in combination creating an adjustable diameter for said adjustable mounting ring;
   (c) said first and second adjustable ring segments being made of resilient material so that a curvature of each of said first and second adjustable ring segments can be altered without causing plastic deformation;
   (d) said first adjustable ring segment including,
      (i) a first full section segment,
      (ii) a first partial section extension extending from a first end of said first full section segment,
      (iii) a second partial section extension extending from a second end of said first full section segment;
   (e) said second adjustable ring segment including,
      (i) a second full section segment,
      (ii) a third partial section extension extending from a first end of said second full section segment, said third partial section extension overlapping said first partial section extension to create a first overlap, with said third partial section extension and said first partial section extension combining in said first overlap to create a full section,
      (iii) a fourth partial section extension extending from a second end of said second full section segment, said fourth partial section overlapping said second partial section extension to create a second overlap, with said fourth partial section extension and said second partial section extension combining in said second overlap to create a full section;
(f) said third partial section extension being connected to said first partial section extension;
(g) said fourth partial section extension being connected to said second partial section extension;
(h) wherein said first and second overlaps are variable in order to vary a diameter of said adjustable mounting ring;
(i) fasteners being used to fix said first and second overlaps as installed to fix said diameter; and
(j) a plurality of lights mounted on said adjustable mounting ring.

8. The decorative lighting system as recited in claim 7, wherein:
(a) said first partial section extension, said second partial section extension, said third partial section extension, and said fourth partial section extension have an L-shaped cross section;
(b) said L-shaped cross section of said third partial section extension is rotated 180 degrees from said L-shaped cross section of said first partial section extension; and
(c) said L-shaped cross section of said fourth partial section extension is rotated 180 degrees from said L-shaped cross section of said second partial section extension.

9. The decorative lighting system as recited in claim 7, wherein each of said partial section extensions includes a plurality of transverse holes configured to receive said fasteners.

10. The decorative lighting system as recited in claim 7, wherein each of said partial section extensions includes a plurality of transverse holes configured to receive said fasteners.

11. The decorative lighting system as recited in claim 7, wherein said full section includes an inward facing surface and an outward facing surface.

12. A decorative lighting system for a vehicle having a hub assembly, comprising:
(a) a mounting bracket connected to said vehicle proximate said hub assembly;
(b) an adjustable mounting ring connected to said mounting bracket, said adjustable mounting ring including a first adjustable ring segment and a second adjustable ring segment secured to said first adjustable ring segment, said first and second adjustable ring segments in combination creating an adjustable diameter for said adjustable mounting ring;
(c) said first and second adjustable ring segments being made of resilient material so that a curvature of each of said first and second adjustable ring segments can be altered without causing plastic deformation;
(d) said first adjustable ring segment including,
(i) a first full section segment,
(ii) a first partial section extension extending from a first end of said first full section segment,
(iii) a second partial section extension extending from a second end of said first full section segment;
(e) said second adjustable ring segment including,
(i) a second full section segment,
(ii) a third partial section extension extending from a first end of said second full section segment, said third partial section extension overlapping said first partial section extension to create a first overlap, with said third partial section extension and said first partial section extension combining in said first overlap to create a full section,
(iii) a fourth partial section extension extending from a second end of said second full section segment, said fourth partial section overlapping said second partial section extension to create a second overlap, with said fourth partial section extension and said second partial section extension combining in said second overlap to create a full section;
(f) said third partial section extension being connected to said first partial section extension;
(g) said fourth partial section extension being connected to said second partial section extension;
(h) a plurality of fasteners locking said first and second overlaps together, thereby fixing said diameter of said adjustable mounting ring; and
(i) a plurality of lights mounted on said adjustable mounting ring.

13. The decorative lighting system as recited in claim 12, wherein:
(a) said first partial section extension, said second partial section extension, said third partial section extension, and said fourth partial section extension have an L-shaped cross section;
(b) said L-shaped cross section of said third partial section extension is rotated 180 degrees from said L-shaped cross section of said first partial section extension; and
(c) said L-shaped cross section of said fourth partial section extension is rotated 180 degrees from said L-shaped cross section of said second partial section extension.

14. The decorative lighting system as recited in claim 12, wherein said fasteners used to connect said third partial section extension to said first partial section extension and said fourth partial section extension to said second partial section extension are each aligned with an axis pointed inward toward a center of said adjustable mounting ring.

15. The decorative lighting system as recited in claim 14, wherein each of said partial section extensions includes a plurality of transverse holes configured to receive said fasteners.

16. The decorative lighting system as recited in claim 12, wherein each of said partial section extensions includes a plurality of transverse holes configured to receive said fasteners.

* * * * *